United States Patent [19]
Hsu

[11] 3,909,183
[45] Sept. 30, 1975

[54] PARISON EXTRUSION HEAD
[75] Inventor: John S. Hsu, Somerville, N.J.
[73] Assignee: Hoover Ball and Bearing Company, Saline, Mich.
[22] Filed: Mar. 18, 1974
[21] Appl. No.: 451,836

[52] U.S. Cl. .......................... 425/466; 425/DIG. 206
[51] Int. Cl.² ........................................ B29D 23/04
[58] Field of Search .............. 425/326 B, 381, 466, 425/DIG. 206; 264/167

[56] References Cited
UNITED STATES PATENTS
| | | | |
|---|---|---|---|
| 2,887,716 | 5/1959 | Crosio | 425/326 B |
| 3,386,132 | 6/1968 | Fischer | 425/381 |
| 3,611,494 | 10/1971 | Feuerherm | 425/461 X |

FOREIGN PATENTS OR APPLICATIONS
1,162,542  2/1964  Germany ................... 425/DIG. 206

Primary Examiner—R. Spencer Annear
Attorney, Agent, or Firm—Olsen and Stephenson

[57]  ABSTRACT

Blow molding apparatus for extruding tubular parisons of thermoplastic material including an extrusion head which has an accumulation chamber from which the thermoplastic material can be discharged intermittently. The body of the extrusion head is axially expansible and contractible for receiving and discharging the thermoplastic material, and it is constructed and arranged so that the material is discharged from the accumulation chamber on a first-in, first-out basis.

9 Claims, 5 Drawing Figures

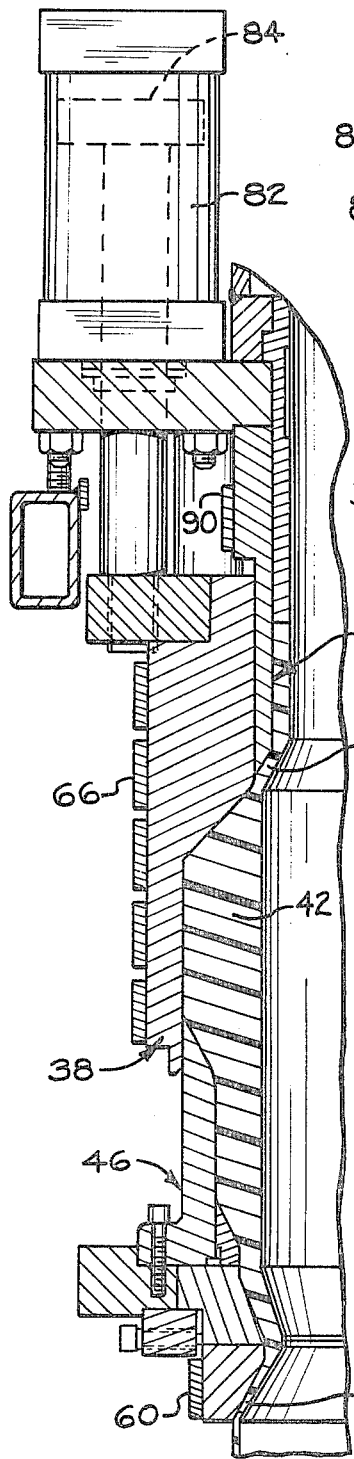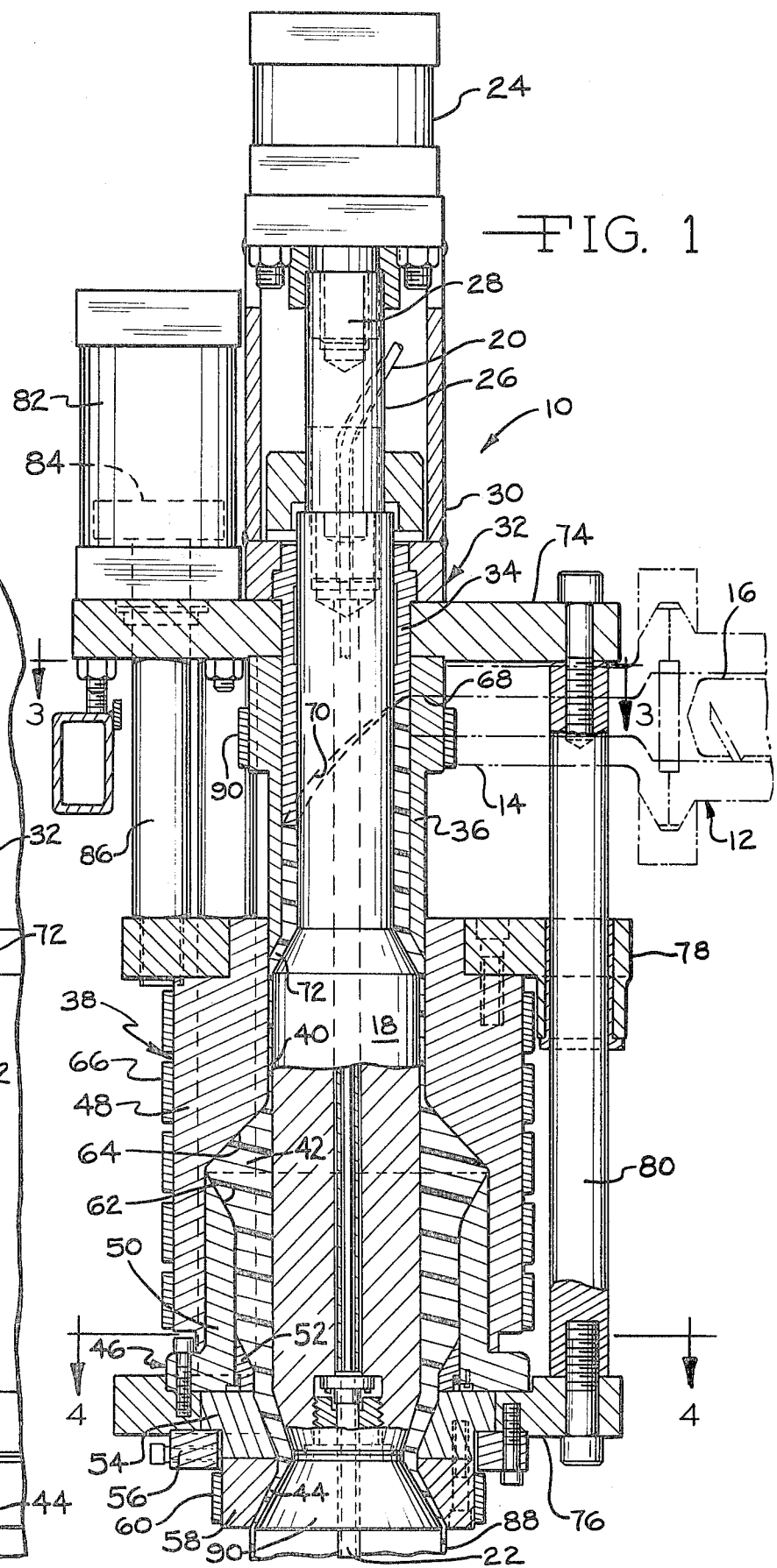

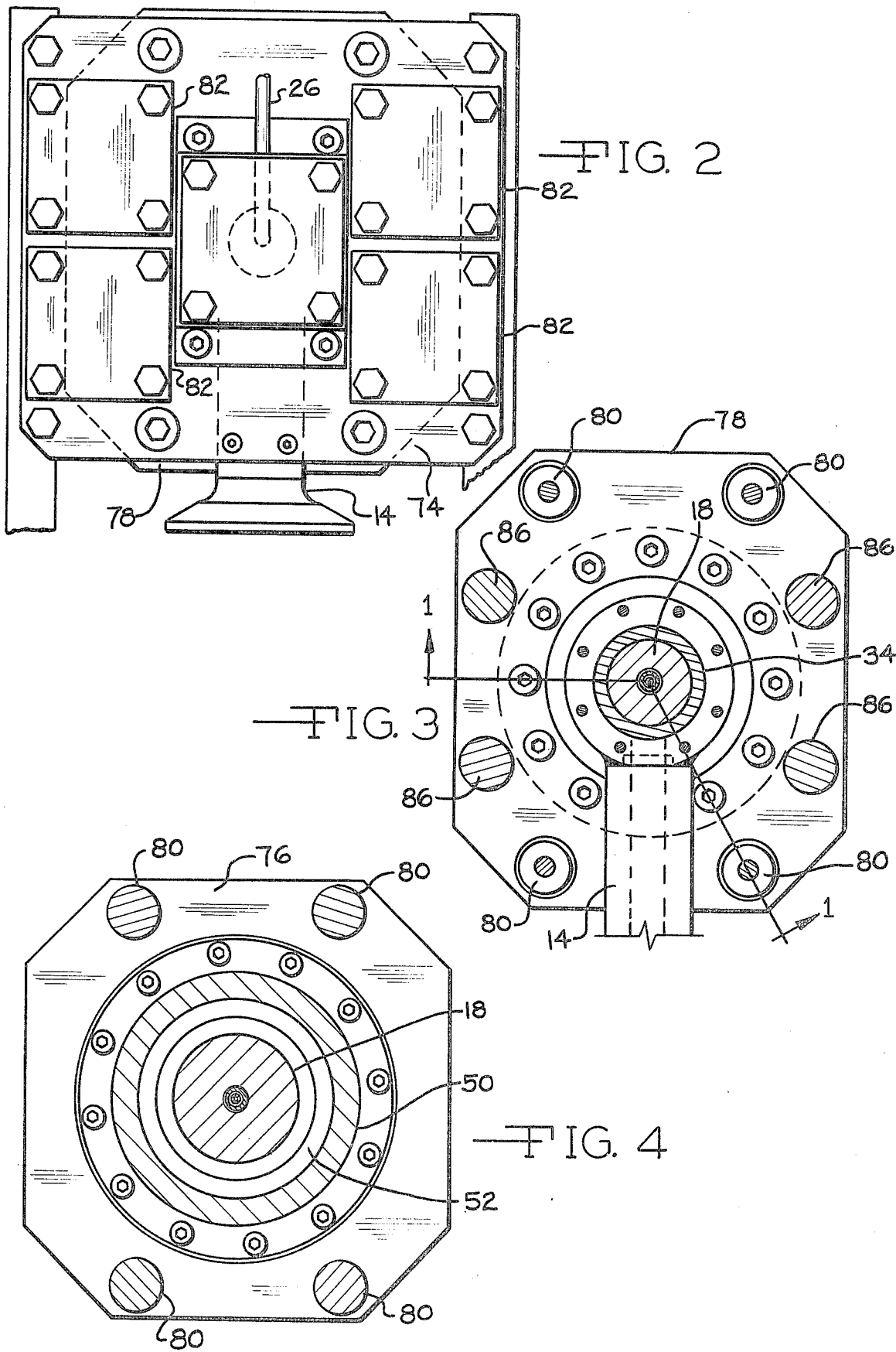

PARISON EXTRUSION HEAD

BACKGROUND OF THE INVENTION

The present invention relates to improvements in apparatus for intermittent extrusion of thermoplastic material from an extrusion head, and particularly to an extrusion head that has an accumulation chamber therein from which thermoplastic material can be discharged intermittently.

It is conventional practice when blow molding small articles to use a continuously extruded parison, but when producing relatively larger articles, problems are encountered if continuous parison extrusion is employed. Thus, it has become the general practice in industry to use intermittent extrusion when producing articles larger than one gallon in size.

Various types of apparatus have been employed to provide intermittent extrusion for blow molding purposes. It is common practice to use a ram or piston for discharging molten plastic material from an accumulation cylinder, such as is shown, for example in the U.S. Pat. No. 2,887,716, issued May 26, 1959 to Crosio. It is also well known to use annular reciprocating pistons in an annular accumulation chamber located in the extrusion head, such as is shown for example, in U.S. Pat. No. 3,345,690, issued Oct. 10, 1967 to Hagen. The apparatus disclosed in the patent to Hagen and to some extent the apparatus disclosed in the patent to Crosio uses a mode of operation in which the first material introduced into the accumulation chamber is the last material discharged therefrom during the extrusion cycle. This has undesirable effects in some instances, and therefore, extrusion apparatus has also been developed which allows a first-in, first-out mode of operation with respect to the accumulation chamber. Operations of this type are known in the prior art as are shown, for example, in U.S. Pat. No. 3,335,457, issued Aug. 15, 1967 to Martin, and in U.S. Pat. No. 3,611,494, issued Oct. 12, 1971 to Feuerherm. The Martin patent discloses a well known extrusion system wherein a reciprocating screw is employed for intermittently discharging the molten thermoplastic material through the annular passage means defined by the extrusion head. The apparatus disclosed in the Feuerherm patent produces similar results, but in this patent an annular piston is located within the annular passage means of the extrusion head for discharging the molten thermoplastic material from the extrusion orifice of the extrusion head. The apparatus disclosed in the Feuerherm patent is an extrusion of the teachings of the reciprocating screw apparatus disclosed in the Martin patent, and the extrusion head can be utilized with any conventional screw extruder which does not have features for reciprocating the screw.

There is a need for further improvements in apparatus of the type wherein the accumulation chamber for the molten thermoplastic material is located within the extrusion head and wherein intermittent extrusion occurs by a mode of operation wherein the first material in is the first material out of the accumulation chamber. In particular, there is a need for an improved extrusion head which provides optimum flow characteristics of the thermoplastic material passing through the extrusion head, and which provides optimum operating conditions for extrusion of annular tubular parisons for blow molding relatively large articles.

SUMMARY OF THE INVENTION

The present invention provides an extrusion head which overcomes the inadequacies of the prior art and provides an extrusion head for use with molding operations requiring intermittent extrusion, and wherein the accumulation chamber for use in the intermittent operation is located in the extrusion head.

According to one form of the present invention, an extrusion head is provided for extruding a tube of plastic material comprising a die mandrel, a die body supported in spaced relation around the die mandrel so as to define therewith an annular inlet orifice followed by an accumulation chamber and an annular outlet orifice. The die body includes a stationary portion at the outlet orifice and a movable portion at the inlet orifice telescoped over the stationary portion and movable axially with respect thereto for varying the volume of the accumulation chamber. A diverter is mounted on the die mandrel and has an inlet port for receiving plastic material. The diverter defines with the die mandrel an annular outlet passage in communication with the aforesaid inlet orifice through which plastic material can flow to the accumulation chamber. The movable portion and the diverter are in a sealed relationship so that plastic material can flow continuously from the diverter to the accumulation chamber. The accumulation chamber has a radially outwardly directed wall adjacent to the annular inlet orifice against which plastic material can flow when received in the accumulation chamber. Means are provided to advance the movable portion of the die body toward the outlet orifice of the extrusion head so that the radially outwardly directed wall functions to exert pressure on the plastic material in the accumulation chamber to extrude a tube of plastic material from the annular outlet orifice. Thus, the molten thermoplastic material can flow in a continuous stream through the extrusion head and the expansion and contraction of the die body will assure that the material will always be discharged from the extrusion head in the same flow sequence that it was introduced into the extrusion head.

In this form of the apparatus, the movable portion of the die body includes heating means for maintaining the movable portion at selected temperatures and thereby assuring close control of the temperature of the molten material being discharged in tubular form from the extrusion head. For reducing the volume of the die body for the purpose of extruding the tubular parison, a stationary mounting plate is connected to the diverter, a stationary die body plate is connected to the stationary portion of the die body adjacent to the annular outlet orifice, and a movable plate is supported on guide rods which extend between the stationary mounting plate and the stationary die body plate, the movable plate being connected to the movable portion of the die body for movement on the guide rods. Pneumatic or hydraulic cylinder means are supported on the stationary mounting plate with the cylinder rod connected to the movable plate for moving the movable portion toward the contracted position of the die body. The accumulation chamber can be moved to its expanded position in response to pressure exerted on the aforesaid radially outwardly directed wall of the accumulation chamber by the molten plastic material in the accumulation chamber.

It is therefore among the objects of the present invention to provide an improved extrusion head for extruding in an optimum manner thermoplastic material intermittently in tubular form for use in blow molding operations.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a vertical sectional view taken on the lines 1—1 of FIG. 3 illustrating an extrusion head embodying one form of the present invention wherein the accumulation chamber is in its contracted position;

FIG. 1a is a fragmentary sectional view similar to FIG. 1, but showing the extrusion head during a different phase of the cycle of operation wherein the accumulation chamber is in its expanded position;

FIG. 2 is a top plan view of the extrusion head;

FIG. 3 is a section taken on the lines 3—3 of FIG. 1; and

FIG. 4 is a section taken on the lines 4—4 of FIG. 1.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

Referring now to the drawings, the invention will be described in greater detail. The extrusion head 10 is shown connected to a conventional extruder 12 by an inlet body member 14. A rotary screw 16 of a conventional construction is located within the extruder 12 for continuous rotation to provide a continuous flow of molten thermoplastic material to the extrusion head 10.

The extrusion head 10 includes a die mandrel 18 that has an air conduit 20 extending axially therethrough to the blow pin 22, and the mandrel 18 is connected at the upper end to a programming cylinder 24 by the mandrel coupler 26. The programming cylinder 24 is a conventional fluid cylinder which has a cylinder rod 28 connected to the mandrel coupler 26 for axially moving the die mandrel 18 in a conventional manner for varying the wall thickness of the parison extruded from the extrusion head 10. The programming cylinder 24 is mounted on the cylinder stand 30 which is integrally connected to the diverter 32. For production purposes the diverter 32 is a two-piece construction comprising the diverter sleeve 34 and the diverter feeder 36.

A die body 38 is supported in spaced relation around the die mandrel 18 so as to define therewith in series an annular inlet orifice 40, an annular accumulation chamber 42 and an annular outlet orifice 44. The die body 38 includes a stationary portion 46 and the movable portion 48 which is telescoped over the stationary portion 46 and is movable axially with respect thereto for varying the volume of the accumulation chamber 42. It will be observed that the movable portion defines with the die mandrel 18 the annular inlet orifice 40 and the upper portion of the annular accumulation chamber 42, and the stationary portion 46 defines with the lower end of the die mandrel 18 the annular outlet orifice 44 and the lower portion of the accumulation chamber 42. The stationary portion 46 is constructed of a plurality of components which are secured together comprising the die body sleeve 50, the sealing ring 52, the die ring 54, the clamp ring 56, the blank die tip 58 and the heating band 60 enclosing the latter. As can be seen best in FIGS. 1 and 1a, the stationary portion 46 is outwardly flared at 62 to provide an enlargement at the upper portion of the annular accumulation chamber 42.

The movable portion 48 has a complementary radially outwardly directed wall 64 adjacent to the annular inlet orifice 40 against which molten plastic material can flow when entering the accumulation chamber 42 from the annular orifice 40. The movable portion 38 also includes the band heaters 66 for maintaining the molten thermoplastic material at a proper temperature when flowing through the annular inlet orifice 40 and while in the annular accumulation chamber 42.

Referring again to the diverter 32, it will be observed that it includes an inlet port 68 through which molten plastic material can flow from the extruder 12 for engagement against the annular shoulder 70 defined by the lower edge of the diverter sleeve 34 for uniform distribution between the die mandrel 18 and the diverter feeder 36. Thus, the diverter feeder 36 and the die mandrel 18 define an annular outlet passage 72 in direct communication with the annular inlet orifice 40 to provide continuous flow of molten thermoplastic material from the extruder 12 to the accumulation chamber 42.

The extrusion head 10 also includes the stationary mounting plate 74 connected with the diverter 32, the stationary die body plate 76 connected with the stationary portion 46 and the movable plate 78 connected to the movable portion 38. The stationary mounting plate 74 is connected to the stationary die body plate 76 by a plurality of guide rods 80 on which the movable plate 78 is adapted to travel for axial expansion and contraction of the accumulation chamber 42.

Mounted on the stationary mounting plate 74 are a plurality of conventional fluid cylinders 82 which include pistons 84 connected to the cylinder rods 86 for lowering the movable plate 78, when desired. In the illustrated embodiment of the invention the cylinders 82 adapted for use in discharging rapidly an annular tubular parison 88 from the annular outlet orifice 44 when desired for blow molding purposes and also to aid in lifting the movable portion 38, when desired.

In the normal operation of the extrusion head 10, when the accumulation chamber 42 is in the contracted condition shown in FIG. 1, molten thermoplastic material will flow from the extruder 12 through the inlet port 68 to the annular inlet passage 40 and from there into the annular accumulation chamber 42. The molten thermoplastic material entering the annular accumulation chamber 42 will flow along the surface of the radially outwardly directed wall 64 and will exert pressure against this well to move the movable portion 38 in an upward direction to the position shown in FIG. 1a. The resistance to flow from the annular outlet orifice 44 is greater than the resistance to movement of the movable portion 38 so that the latter will move to the position shown in FIG. 1a without any substantial discharge of molten thermoplastic material from the annular outlet orifice 44. When the movable portion 38 is in the elevated position, it can be returned to the position shown in FIG. 1 by actuation of the fluid cylinders 82 in response to a suitable control signal, thereby discharging a shot of molten thermoplastic material from the annular outlet orifice 44. During these operations a sealed relationship remains between the telescopically connected movable and stationary portions 38 and 46 and between the movable portion 38 and the diverter 32. Also, heating bands 60 and 66 at the stationary and movable portion 46 and 38 and the heating band 90 at the diverter 32 will assure optimum temperature control of the molten plastic material flowing through the extrusion head 10.

From the foregoing description it will be recognized that a unique construction and arrangement has been provided to assure not only accurate temperature control of the molten thermoplastic material is provided but also that the molten material flows through the accumulation chamber 42 on a first-in, first-out basis so that the thermoplastic material discharged at the annular outlet orifice 44 has optimum physical properties to provide superior blow molded articles of relatively large dimensions.

The die mandrel 18 has a removable blank tip 90 so that, if desired, it and the blank die tip 58 and ring 54 can be changed to provide variations in the diameter of the tubular parison 88 that is extruded from the annular outlet orifice 44.

It is claimed:

1. An extrusion head for extruding a tube of plastic material comprising a die mandrel, a die body enclosing said die mandrel to define therewith an annular outlet orifice, an annular inlet orifice and an annular accumulation chamber in communication with and located between said inlet and outlet orifices, a diverter supported on said die mandrel and having an inlet port for receiving plastic material from an extruder and defining with said die mandrel an annular outlet port in communication with said annular inlet orifice for passage of the plastic material from said extruder to said accumulation chamber, said die body being axially expansible and contractible for expanding and contracting the volume of said accumulation chamber so that plastic material can be received through said inlet orifice and accumulated in said chamber when said die body is expanded and can be discharged through said outlet orifice when said die body is contracted.

2. The extrusion head that is defined in claim 1, wherein said die body includes two sections telescoped together and axially movable relative to one another for axially expanding and contracting the volume of said accumulation chamber.

3. An extrusion head for extruding a tube of plastic material comprising a die mandrel, a die body supported in spaced relation around said die mandrel so as to define therewith an annular outlet orifice, an annular inlet orifice and an annular accumulation chamber in communication with and located between said inlet and outlet orifices, said die body including a stationary portion at said outlet orifice and a movable portion at said inlet orifice telescoped over said stationary portion and movable axially with respect thereto for varying the volume of said accumulation chamber, and a stationary diverter mounted on said die mandrel and having an inlet port for receiving plastic material from an extruder, said diverter defining said die mandrel an annular outlet passage in communication with said inlet orifice for flow of plastic material to said accumulation chamber.

4. The extrusion head that is defined in claim 3, wherein said movable portion is telescoped over said diverter and is movable axially relative thereto when said movable portion is moved to vary the volume of said accumulation chamber.

5. The extrusion head that is defined in claim 4, including a cylinder mounting plate on which said diverter is supported, a die body plate on which said stationary portion is mounted, said mounting and die body plates being interconnected by a plurality of guide rods, a movable plate supported on said guide rods for travel thereon and connected to said movable portion, and fluid cylinder means mounted on said cylinder mounting plate and having cylinder rods connected to said movable plate for moving the latter and thereby said movable portion.

6. The extrusion head that is defined in claim 5, wherein said movable portion has a radially outwardly directed wall adjacent to said annular inlet against which plastic material can flow when received in the accumulation chamber from said diverter and responsive to pressure of the plastic material in the accumulation chamber for moving said movable portion away from said stationary portion.

7. An extrusion head for extruding a tube of plastic material comprising a die mandrel, a die body supported in spaced relation around said die mandrel so as to define therewith in series an annular inlet orifice, an accumulation chamber and an annular outlet orifice, said die body including a stationary portion at said outlet orifice and a movable portion at said inlet orifice telescoped over said stationary portion and movable axially with respect thereto for varying the volume of said accumulation chamber, a diverter mounted on said die mandrel and having an inlet port for receiving plastic material, said diverter defining with said die mandrel an annular outlet passage in communication with said inlet orifice for flow of plastic material to said accumulation chamber, said movable portion and said diverter being in a sealed relation so that plastic material can continue to flow from said diverter to said accumulation chamber during movement of said movable portion, said accumulation chamber having a radially outwardly directed wall adjacent to said annular inlet orifice against which plastic material can flow when received in said accumulation chamber, and means to advance said movable portion toward said outlet orifice so that said wall will exert pressure on the plastic material in the accumulation chamber to extrude a tube of plastic material from said annular outlet orifice.

8. The extrusion head that is defined in claim 7, wherein said movable portion includes heating means for maintaining the movable portion at selected tempertures.

9. The extrusion head that is defined in claim 7, including a stationary mounting plate connected with said diverter, a stationary die body plate connected with said stationary portion, said mounting plate and said die body plate being interconnected by a plurality of guide rods, a movable plate supported on said guide rods for travel thereon and connected to said movable portion, said means being supported by one of said stationary plates and connected to said movable plate for moving the latter.

* * * * *

UNITED STATES PATENT OFFICE
CERTIFICATE OF CORRECTION

Patent No. 3,909,183  Dated September 30, 1975

Inventor(s) John S. Hsu

It is certified that error appears in the above-identified patent and that said Letters Patent are hereby corrected as shown below:

Column 1, line 51, "extrusion" should read -- extension --.

Column 4, line 63, "well" should read -- wall --.

Column 6, line 2, "extruder, said diverter defining said die mandrel an an-" should read, -- extruder, said diverter defining with said die mandrel an an- --.

Signed and Sealed this eighth Day of June 1976

[SEAL]

Attest:

RUTH C. MASON
Attesting Officer

C. MARSHALL DANN
Commissioner of Patents and Trademarks